(12) United States Patent
Walbolt et al.

(10) Patent No.: US 11,006,660 B2
(45) Date of Patent: May 18, 2021

(54) STACKABLE FOOD FORMATION DEVICE FOR FREEZING SOLID OR LIQUID FOOD ITEMS

(71) Applicant: Nusia Foods LLC, Saint Paul, MN (US)

(72) Inventors: Rothana Theoung Walbolt, Eagan, MN (US); Pitisak Pete Walbolt, Eagan, MN (US)

(73) Assignee: NUSIA FOODS LLC, Saint Paul, MN (US)

( * ) Notice: Subject to any disclaimer, the term of this patent is extended or adjusted under 35 U.S.C. 154(b) by 168 days.

(21) Appl. No.: 15/918,087

(22) Filed: Mar. 12, 2018

(65) Prior Publication Data

US 2019/0053532 A1   Feb. 21, 2019

Related U.S. Application Data (60) Provisional application No. 62/547,252, filed on Aug. 18, 2017.

(51) Int. Cl.
*A23P 30/10* (2016.01)
*F25D 25/00* (2006.01)

(52) U.S. Cl.
CPC ............ *A23P 30/10* (2016.08); *F25D 25/005* (2013.01)

(58) Field of Classification Search
CPC ....... A23P 30/10; F25D 25/005; B65D 5/001; B65D 57/00; B65D 21/041; B65D 21/0228; B65D 21/0224; B65D 90/0013; B65D 2590/0033; B65D 88/121; B65D 90/0006; Y10T 24/1402; F16B 21/02; A47F 3/14; A47F 7/0007; A47F 7/0014; A47B 73/006

USPC .................. 24/17 R; 294/161, 163, 165, 167
See application file for complete search history.

(56) References Cited

U.S. PATENT DOCUMENTS

| | | | | |
|---|---|---|---|---|
| 3,182,856 A * | 5/1965 | Goltz | ................. | B65D 21/0213 206/509 |
| 3,521,764 A * | 7/1970 | Loomis | .............. | B65D 21/0209 206/386 |
| 5,372,257 A * | 12/1994 | Beauchamp | ....... | B65D 21/0213 206/504 |
| 6,428,921 B1 * | 8/2002 | Grot | ...................... | H01M 8/247 429/470 |
| 8,348,564 B2 * | 1/2013 | Fukui | ................. | B65D 90/0013 410/69 |
| 2014/0209499 A1 * | 7/2014 | Hobson | .............. | B65D 21/0215 206/503 |

* cited by examiner

*Primary Examiner* — Leith S Shafi (57) ABSTRACT

A stackable food storage unit comprises a plurality of stackable compartments, a cover plate, and an attachment mechanism. Each of the plurality of stackable compartments are removably attached to each other through the at least one attachment mechanism. Since each of the stackable compartments are pressed against each other, a user can freeze a preferred food item in between a first compartment and a second compartment from the plurality of stackable compartments. The cover plate can be removably attached to a topmost compartment of the plurality of stackable compartments. Thus, a food item can be stored in between the cover plate and the topmost compartment. The size, shape, and volume of each of the plurality of stackable compartments can vary. The material used for manufacturing each of the plurality of stackable compartments is temperature resistant.

9 Claims, 11 Drawing Sheets

STACKABLE FOOD FORMATION DEVICE FOR FREEZING SOLID OR LIQUID FOOD ITEMS

The current application claims a priority to the U.S. Provisional Patent application Ser. No. 62/547,252 filed on Aug. 18, 2017.

FIELD OF THE INVENTION

The present invention relates generally to a device that helps freeze food items in a uniform shape for stacking purposes. More specifically, the present invention is a formation device that helps food items be stacked so that the overall space consumption within the freezing unit is minimized.

BACKGROUND OF THE INVENTION

People often look for various ways to store frozen food items. Many families have an extra freezer to store foods for long-term storage. Frozen foods, either prepared, cooked or raw, offer convenience and capability to have food products to eat with little prep time. Also, in some seasons, there are food products available in abundance, so people may want to store the item for times when the product is not available.

Keeping food items organized allows users to save time and freezer space. Storing food products is a common practice that dates back many centuries. The invention of freezing units has allowed people to store food items for a long period of time. If not stored properly food products can lose nutritional value and form freezer burns.

Most households have a freezer/refrigerator nowadays, and many people purchase frozen foods as well as freeze their own foods for long term storage. A common practice is to freeze food items in plastic bags with zip seals. While this method may work well, if numerous bags are placed in the freezing compartment, it can be difficult to keep all the objects organized in an orderly fashion and in most cases, the bags are not stackable. The shapes of the bags will all be different based on how the bags are put in the freezer and the items that are frozen inside the bag. In addition, liquids expand when frozen, therefore it is not uncommon for bags to expand to different shapes during the freezing process, and even possibly spill the contents inside the freezer.

The objective of the present invention is to address the aforementioned issues. In particular, the present invention introduces a formation device that helps freeze food items into a uniform shape that is stackable. Thus, the overall space consumption within the freezing compartment is minimized. Moreover, the effective design of the present invention allows liquid food items and solid food items to be frozen with the same convenience.

DETAIL DESCRIPTIONS OF THE INVENTION

All illustrations of the drawings are for the purpose of describing selected versions of the present invention and are not intended to limit the scope of the present invention.

The present invention introduces a formation device for freezing food items into a stackable shape. More specifically, the present invention helps food items to be frozen in a uniform shape within a resealable bag so that the overall space consumption within a freezer is minimized. The effective design of the present invention allows a variety of food items to be conveniently frozen and then stored through stacking. Liquid food items such as soups and solid food items such as fruits can be conveniently frozen into a uniform shape by utilizing the present invention.

Figure 1A:
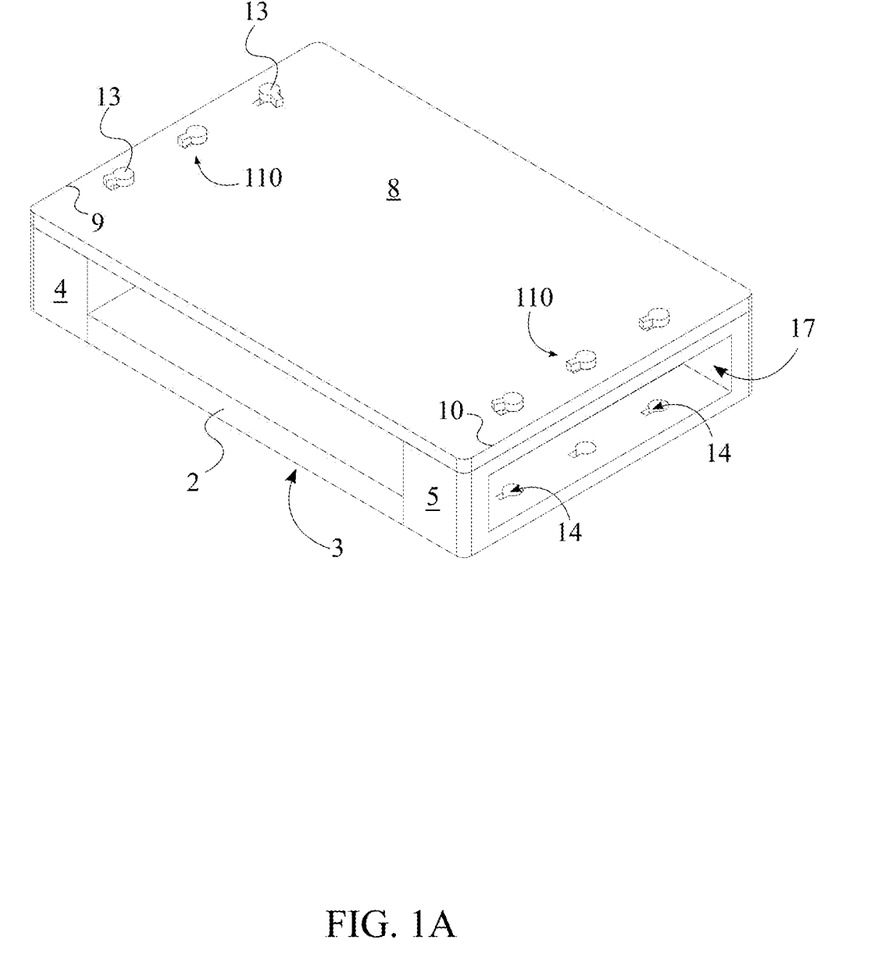
FIG. 1A is a perspective view of the present invention, wherein a single compartment of the plurality of stackable compartments is used.
Figure 1B:
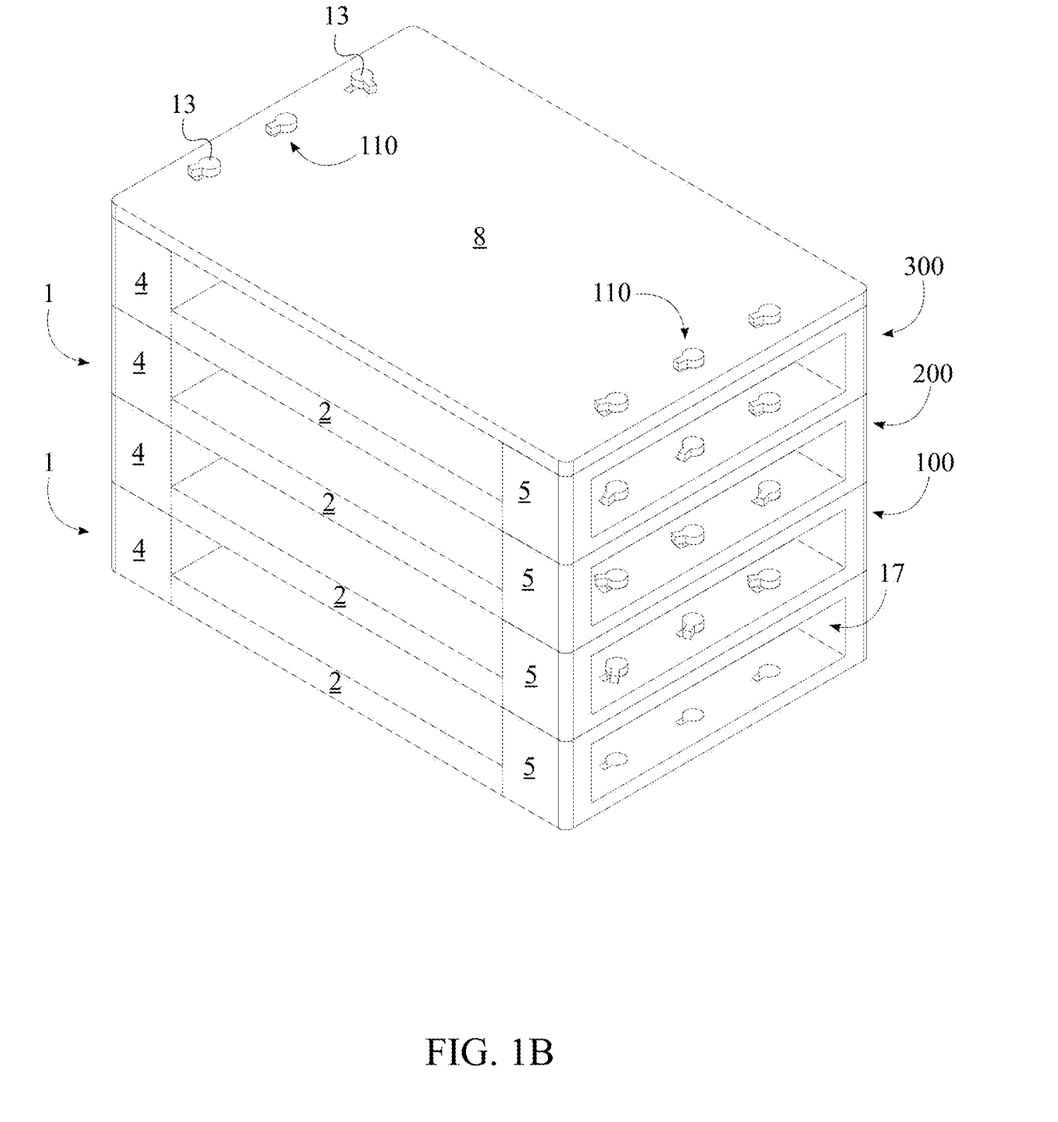
FIG. 1B is a perspective view of the present invention, wherein multiple compartments of the plurality of stackable compartments are used.
Figure 2A:
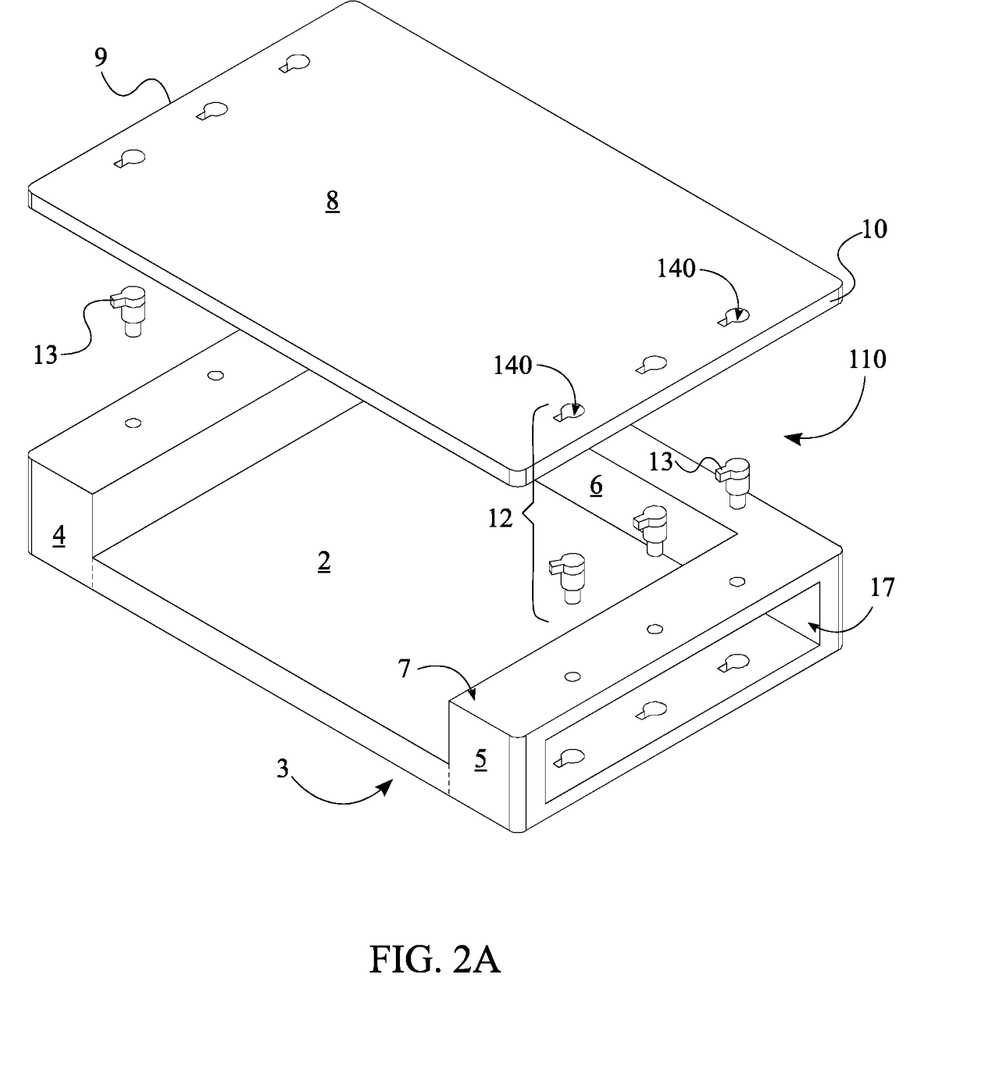
FIG. 2A is an exploded perspective view of the present invention, wherein only one compartment is used.
Figure 2B:
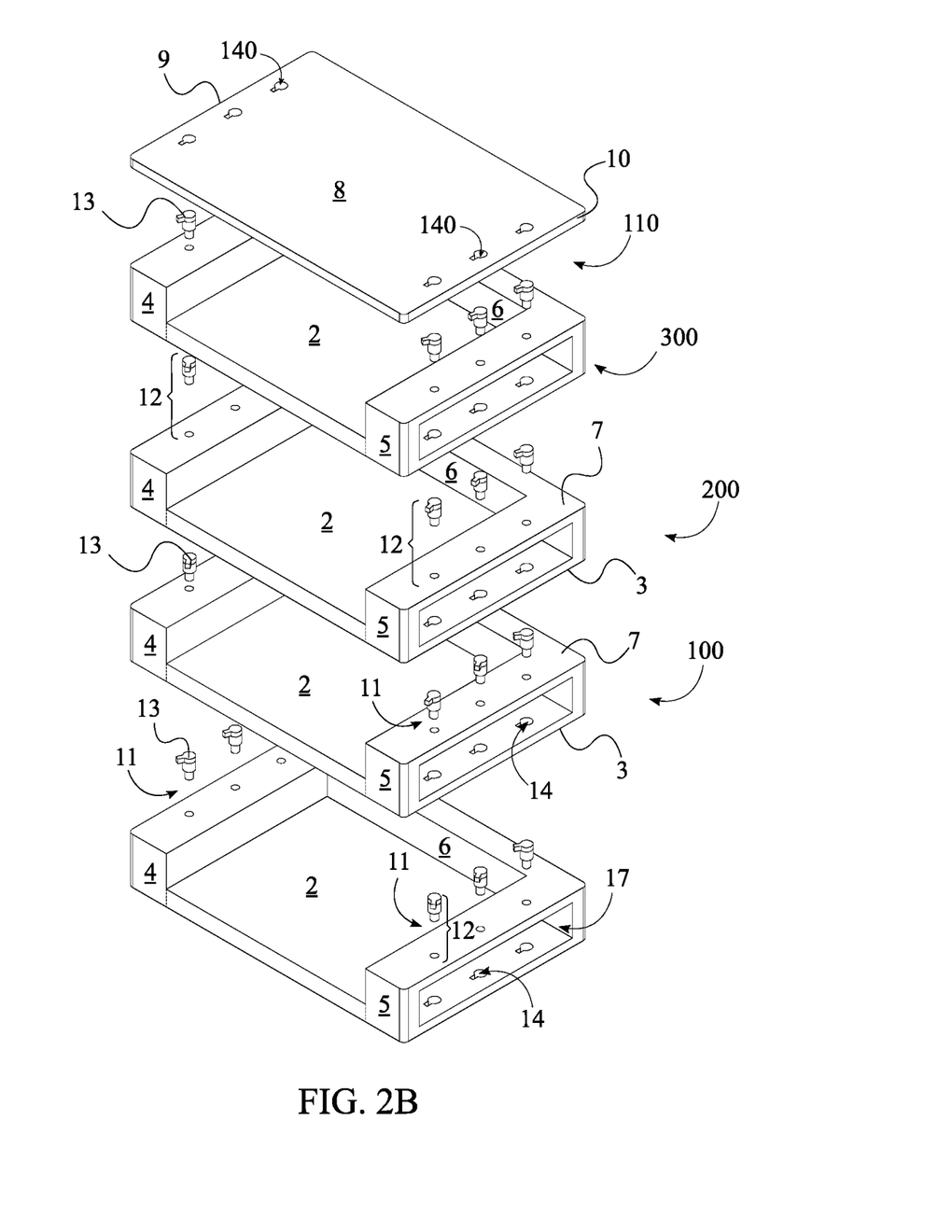
FIG. 2B is an exploded perspective view of the present invention, wherein multiple compartments are used.

As illustrated in FIGS. 1A-2B, to fulfill the intended objectives, the present invention comprises a plurality of stackable compartments 1, a cover plate 8, at least one attachment mechanism 11, and a secondary attachment mechanism 110. The plurality of stackable compartments 1 is used to store the preferred food items. As mentioned before, the food items can vary according to user preference. The size and shape of each of the plurality of stackable compartments 1 can vary from one embodiment to another. Moreover, the number of compartments utilized from the plurality of stackable compartments 1 can also vary according to user preference. As an example, as seen in FIG. 1A, the user can use a single compartment of the plurality of stackable compartments 1. In another instance, as seen in FIG. 1B, the user can utilize four compartments of the plurality of stackable compartments 1. The number of compartments selected from the plurality of stackable compartments 1 varies according to user need and user preference. Regardless of the number of stackable compartments that are being used, the cover plate 8 is used to secure a topmost compartment 300 of the plurality of stackable compartments 1. Referring to the previous example, when the single compartment is used, the cover plate 8 is positioned over the single compartment so that the food item is trapped in between the cover plate 8 and the single compartment. On the other hand, when four compartments are used, the cover plate 8 is positioned over the topmost compartment 300 so that the food item is trapped between the cover plate 8 and the topmost compartment 300. Food items within the three remaining compartments are secured by the proceeding compartment. In other words, the food item positioned in a bottom compartment is secured by positioning another compartment atop the bottom compartment. As seen in FIG. 2B, the at least one attachment mechanism 11, which can vary in different embodiments, is used to attach each of the plurality of stackable compartments 1. On the other hand, the secondary attachment mechanism 110, which can also vary in different embodiments, is used to attach the cover plate 8 to the topmost compartment 300.

Figure 3A:
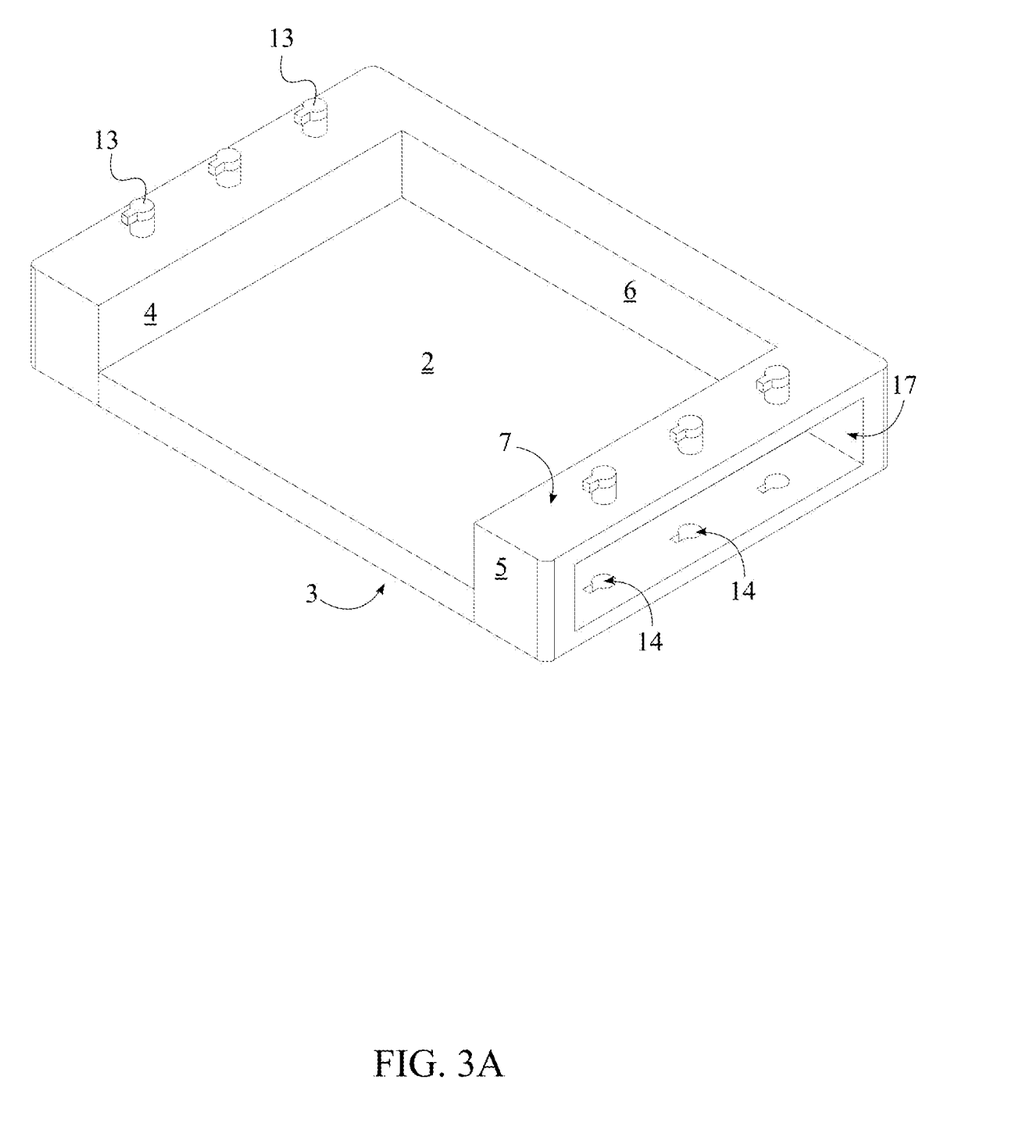
FIG. 3A is a perspective view of one of the plurality of stackable compartments.
Figure 3B:
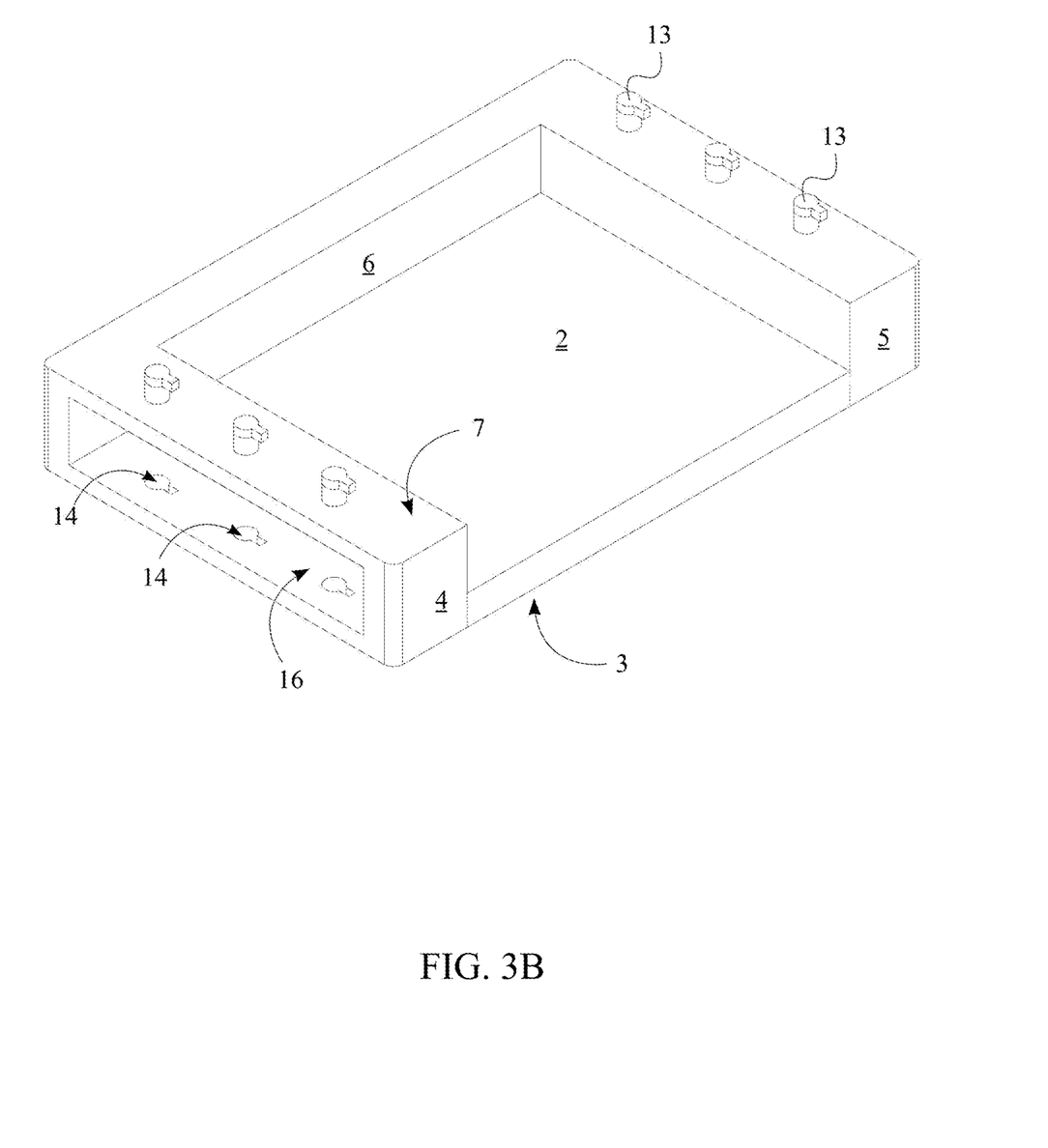
FIG. 3B is another perspective view of one of the plurality of stackable compartments.

As seen in FIG. 2A, FIG. 3A, and FIG. 3B, when considering the overall structure, each of the plurality of stackable compartments 1 comprises a top surface 7 and a bottom surface 3. A distance between the top surface 7 and the bottom surface 3 determines the overall thickness of each of the plurality of stackable compartments 1. Therefore, when an arbitrary compartment 100 and an adjacent compartment 200 from the plurality of stackable compartments 1 are removably attached to each other, the top surface 7 of the arbitrary compartment 100 is pressed against the bottom surface 3 of the adjacent compartment 200 as seen in FIG. 1B and FIG. 2B. If the adjacent compartment 200 is the topmost compartment 300, the cover plate 8 is removably attached to the top surface 7 of the adjacent compartment 200 through the secondary attachment mechanism 110. As a result, the food item positioned within the arbitrary compartment 100 and the food item positioned within the adjacent compartment 200 remains secure.

A preferred food item is frozen into a specific stackable shape through the design of each of the plurality of stackable compartments 1. In the preferred embodiment of the present invention, the food item and packaging are frozen into a rectangular shape. The uniform rectangular shape allows the user to remove the food item and conveniently stack the frozen food item when needed. Even though the food item and packaging are frozen into a rectangular shape in the preferred embodiment, in other embodiments the food item and packaging can be frozen into different shapes, such as, but not limited to, triangular, oval, circular, n-gonal prisms, or other shapes. To do so, each of the plurality of stackable compartments 1 will be designed accordingly.

As seen in FIG. 3A and FIG. 3B, to obtain the rectangular shape of the preferred embodiment, each of the plurality of stackable compartments 1 comprises a base plate 2, a first lateral wall 4, a second lateral wall 5, and an intermediate lateral wall 6. To create the rectangular shape of the preferred embodiment, the first lateral wall 4 is laterally and perpendicularly connected to the base plate 2. Similarly, the second lateral wall 5 is laterally and perpendicularly connected to the base plate 2 opposite to the first lateral wall 4 along the base plate 2 and is oriented parallel to the first lateral wall 4. The intermediate lateral wall 6 is laterally and perpendicularly connected to the base plate 2 in between the first lateral wall 4 and the second lateral wall 5. However, in other embodiments, if the plurality of stackable compartments 1 is designed differently as discussed before, the components of each of the plurality of stackable compartments 1 will be positioned differently.

In the preferred embodiment, when the arbitrary compartment 100 is the topmost compartment 300, and the cover plate 8 is removably attached to the top surface 7 of the arbitrary compartment 100 as in FIG. 1A, the perpendicular positioning of the cover plate 8, the base plate 2, the first lateral wall 4, the intermediate lateral wall 6, and the second lateral wall 5 configures the food item and packaging into a stackable shape that is rectangular in the preferred embodiment.

On the other hand, when the arbitrary compartment 100 is not the topmost compartment 300, and the adjacent compartment 200 is removably attached to the arbitrary compartment 100 as in FIG. 1B, the base plate 2 of the adjacent compartment 200 fulfills one lengthwise portion of the rectangle. The base plate 2 of the arbitrary compartment 100 fulfills the corresponding lengthwise portion of the rectangle. The first lateral wall 4 and the second lateral wall 5 of the arbitrary compartment 100 fulfill the widthwise portions of the rectangle. However, in other embodiments of the present invention, each of the plurality of stackable compartments 1 can be designed differently so that the food item and packaging obtain a different shape when frozen.

Figure 4:
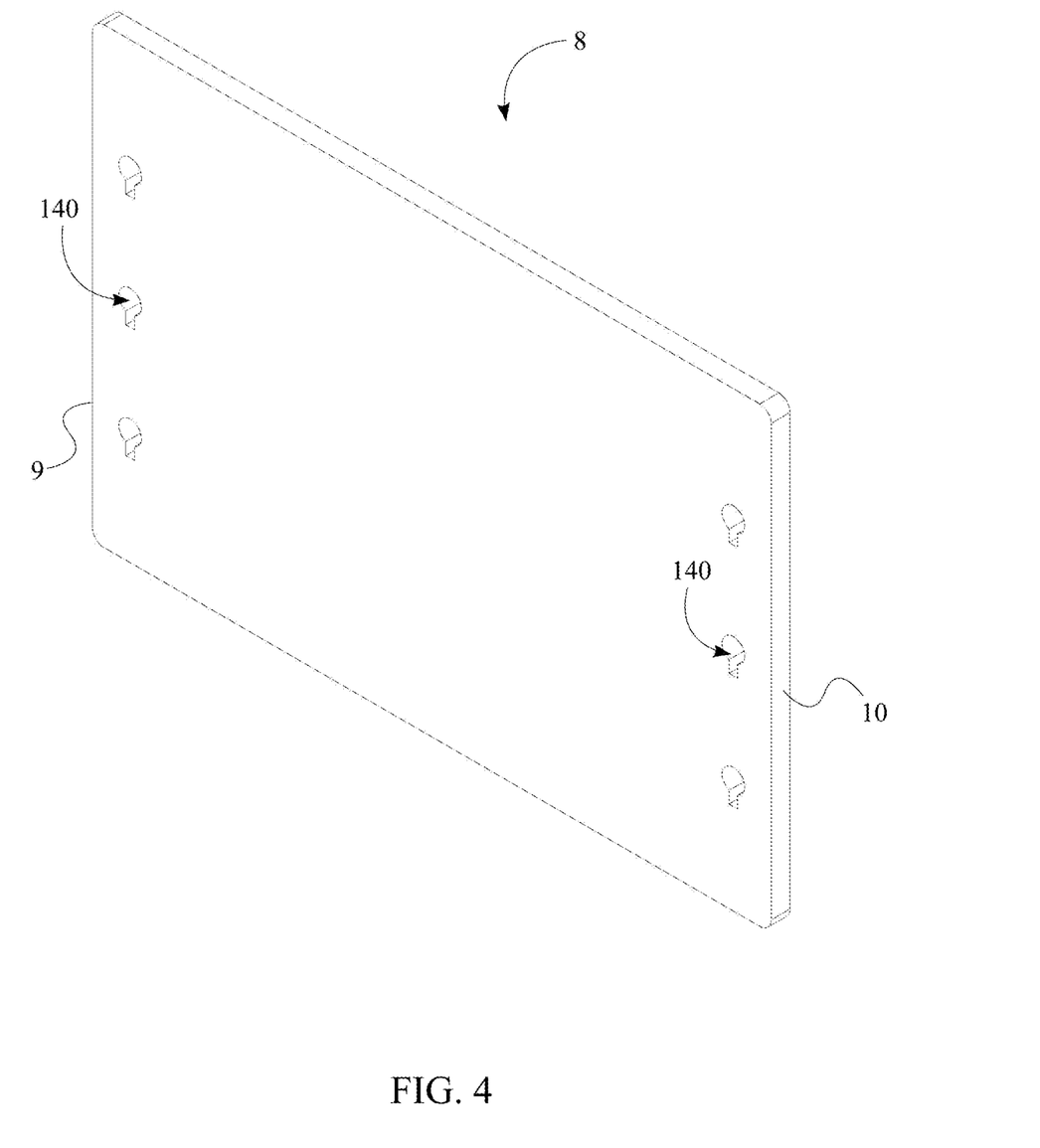
FIG. 4 is a perspective view of the cover plate.

As discussed before, when a single compartment from the plurality of stackable compartments 1 is used, the food item is trapped in between the cover plate 8 and the base plate 2 of the single compartment. As seen in FIG. 2A and FIG. 4, a first lateral edge 9 of the cover plate 8 is aligned with the first lateral wall 4. Moreover, a second lateral edge 10 of the cover plate 8 is aligned with the second lateral wall 5. In general, the cover plate 8 is designed to correspond to the shape of each of the plurality of stackable compartments 1. More specifically, the dimensions of the cover plate 8 are selected to match the dimensions of each of the plurality of stackable compartments 1.

When food items are positioned into the single compartment, the food item and packaging are inserted through an opening created by the first lateral wall 4, the second lateral wall 5, the base plate 2, and the cover plate 8. In another instance, when more than one compartment from the plurality of stackable compartments 1 is used, the food item and packaging are inserted through an opening created by the first lateral wall 4, the second lateral wall 5, the base plate 2 of the arbitrary compartment 100, and the base plate 2 of the adjacent compartment 200. When completely inserted, the food item and packaging rest against the intermediate lateral wall 6 of the arbitrary compartment 100 that is positioned opposite to the opening.

Figure 5:
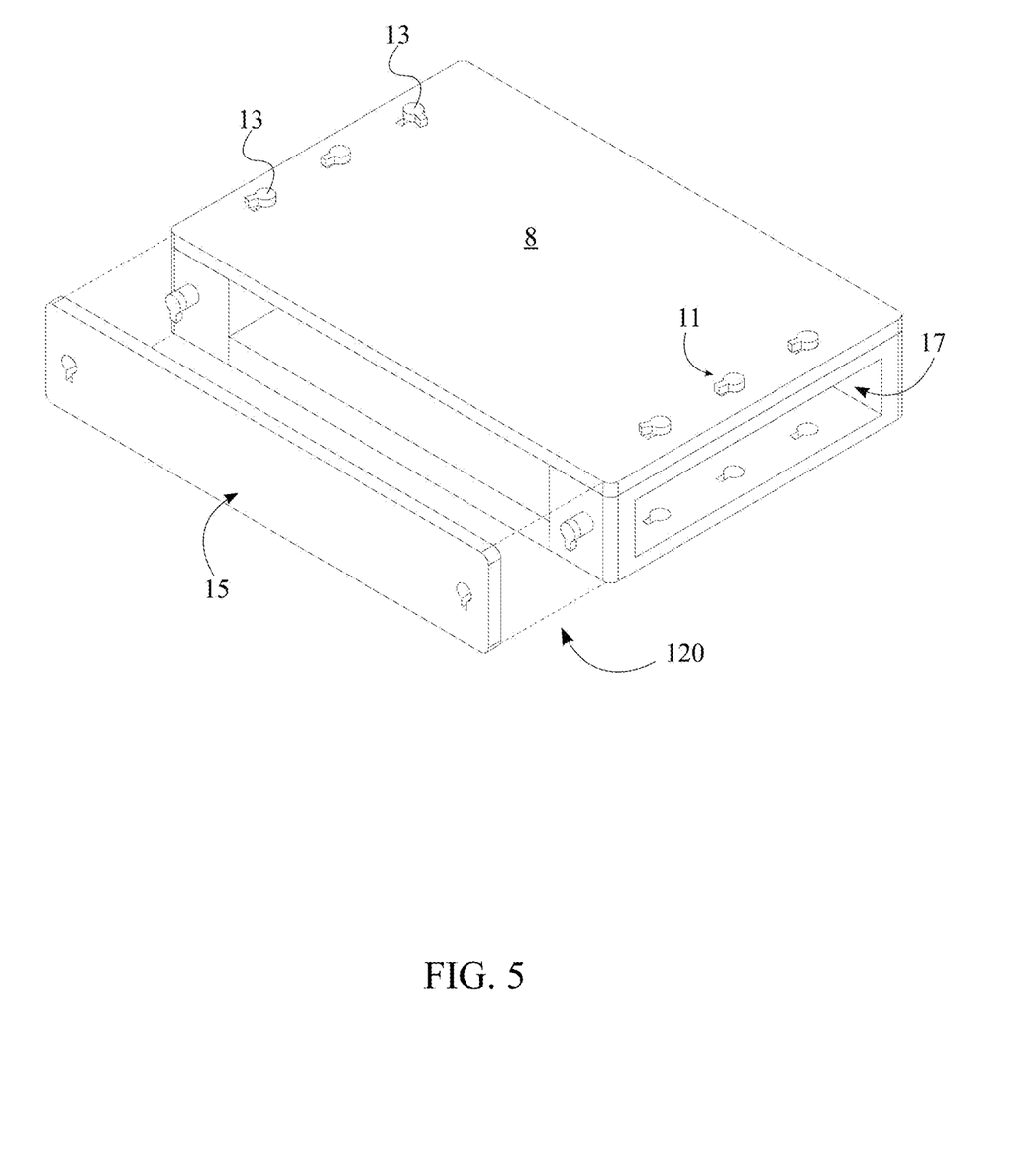
FIG. 5 is a perspective view of the present invention, wherein the compartment lid is used.

According to user preference, or based upon the food item, the user might require the opening to be concealed. To fulfill the need, in another embodiment, the present invention comprises a compartment lid 15 as seen in FIG. 5. To conceal the food item, the compartment lid 15 will be removably and terminally attached to the first lateral wall 4 and the second lateral wall 5 opposite to the intermediate lateral wall 6. The compartment lid 15 can be removably attached through a lid attachment mechanism 120 or any other comparable mechanism. If the compartment lid 15 is used with the single compartment, in the final configuration, the compartment lid 15 will be positioned perpendicular to the cover plate 8. If the compartment lid 15 is used with the arbitrary compartment 100, the compartment lid 15 will be perpendicular to the base plate 2 of both the adjacent compartment 200 and the arbitrary compartment 100.

As discussed earlier, the at least one attachment mechanism 11 is used to attach the plurality of stackable compartments 1 to each other. As shown in FIG. 2B, in the preferred embodiment of the present invention, the at least one attachment mechanism 11 is a toggle mechanism 12. However, the at least one attachment mechanism 11 can vary in different embodiments of the present invention.

As seen in FIG. 3A and FIG. 3B, the toggle mechanism 12 of the present invention comprises a plurality of toggle pins 13 and a plurality of pin-receiving holes 14. The plurality of toggle pins 13 is distributed along the top surface 7 of each of the plurality of stackable compartments 1. In a different embodiment of the present invention, the plurality of toggle pins 13 can be removably positioned into the top surface 7 of each of the plurality of stackable compartments 1. Thus, the user can replace the plurality of toggle pins 13 if the need arises. On the other hand, the plurality of pin-receiving holes 14 is distributed along the bottom surface 3 of each of the plurality of stackable compartments 1. Thus, when the top surface 7 of the arbitrary compartment 100 is pressed against the bottom surface 3 of the adjacent compartment 200, the plurality of toggle pins 13 of the arbitrary compartment 100 is removably positioned into the plurality of pin-receiving holes 14 of the adjacent compartment 200. The plurality of toggle pins 13 and the plurality of pin-receiving holes 14 can vary in size and shape in different embodiments of the present invention. For instance, in another embodiment of the present invention, the plurality of toggle pins 13 will be knob-shaped. In such instances, the plurality of pin-receiving holes 14 will be appropriately shaped to accommodate the plurality of toggle pins 13 that is knob-shaped.

As seen in FIG. 2A and FIG. 4, for the cover plate 8 to attach to each of the plurality of stackable compartments 1, a second plurality of pin-receiving holes 140 of the secondary attachment mechanism 110 traverses through the cover plate 8 along the first lateral edge 9 and the second lateral edge 10. Therefore, when the first lateral edge 9 is aligned with the first lateral wall 4 and the second lateral edge 10 is aligned with the second lateral wall 5, the plurality of toggle pins 13 is removably positioned into the second plurality of pin-receiving holes 140.

As further illustrated in FIG. 3A and FIG. 3B, in the preferred embodiment of the present invention, the at least one attachment mechanism 11 further comprises a first engagement channel 16 and a second engagement channel 17. The at least one attachment mechanism 11 is integrated into both the first engagement channel 16 and the second engagement channel 17 for user convenience. To do so, the first engagement channel 16 laterally traverses into the first lateral wall 4 opposite to the base plate 2 of each of the plurality of stackable compartments 1. Likewise, the second engagement channel 17 laterally traverses into the second lateral wall 5 opposite to the base plate 2 of each of the plurality of stackable compartments 1. To utilize the first engagement channel 16 and the second engagement channel 17 in attaching each of the plurality of stackable compartments 1, the plurality of toggle pins 13 is distributed along the first engagement channel 16 and the second engagement channel 17 at the top surface 7. To correspond to the plurality of toggle pins 13, the plurality of pin-receiving holes 14 is distributed along the first engagement channel 16 and the second engagement channel 17 at the bottom surface 3.

Figure 6:
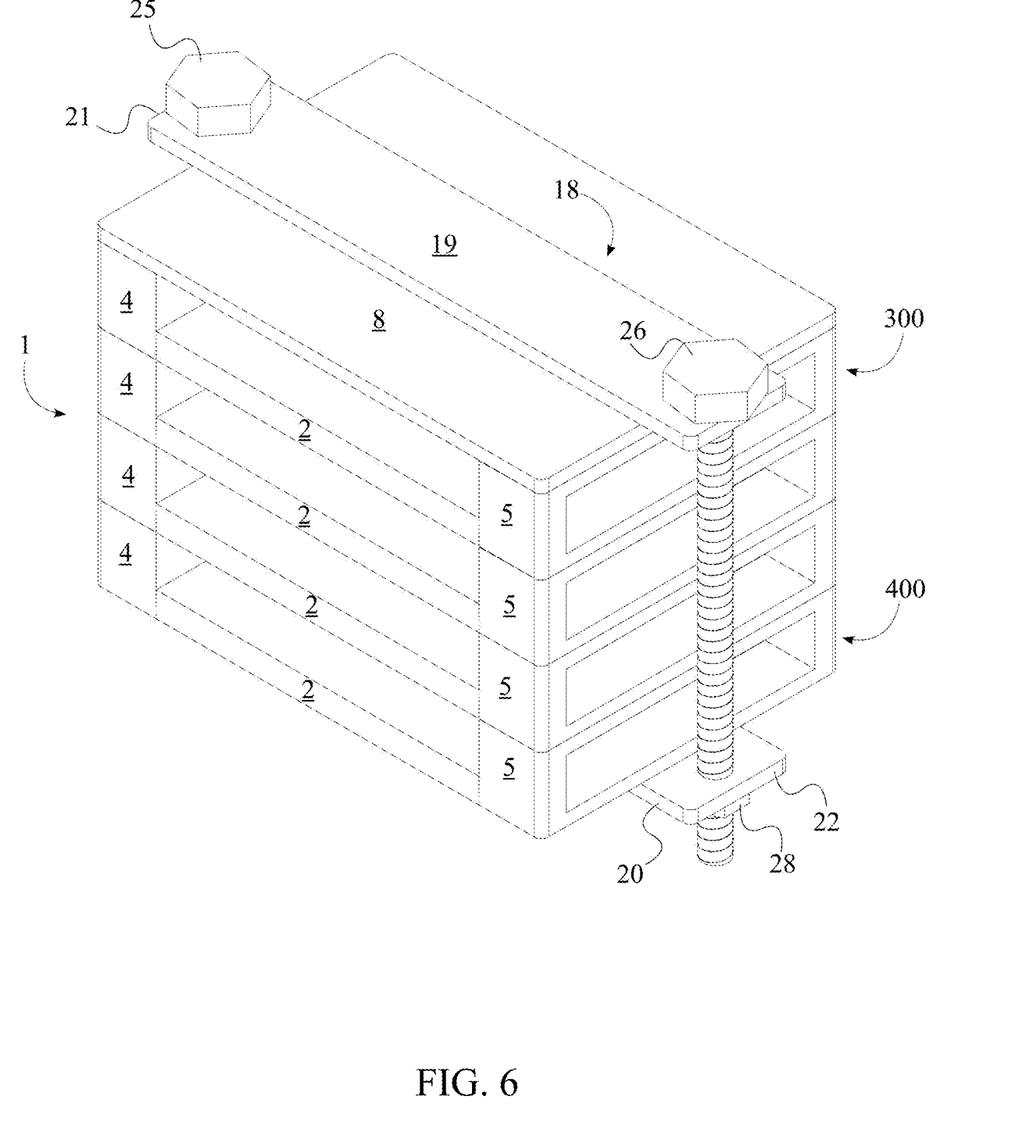
FIG. 6 is a perspective view of the present invention, wherein a locking clamp is used.
Figure 7:
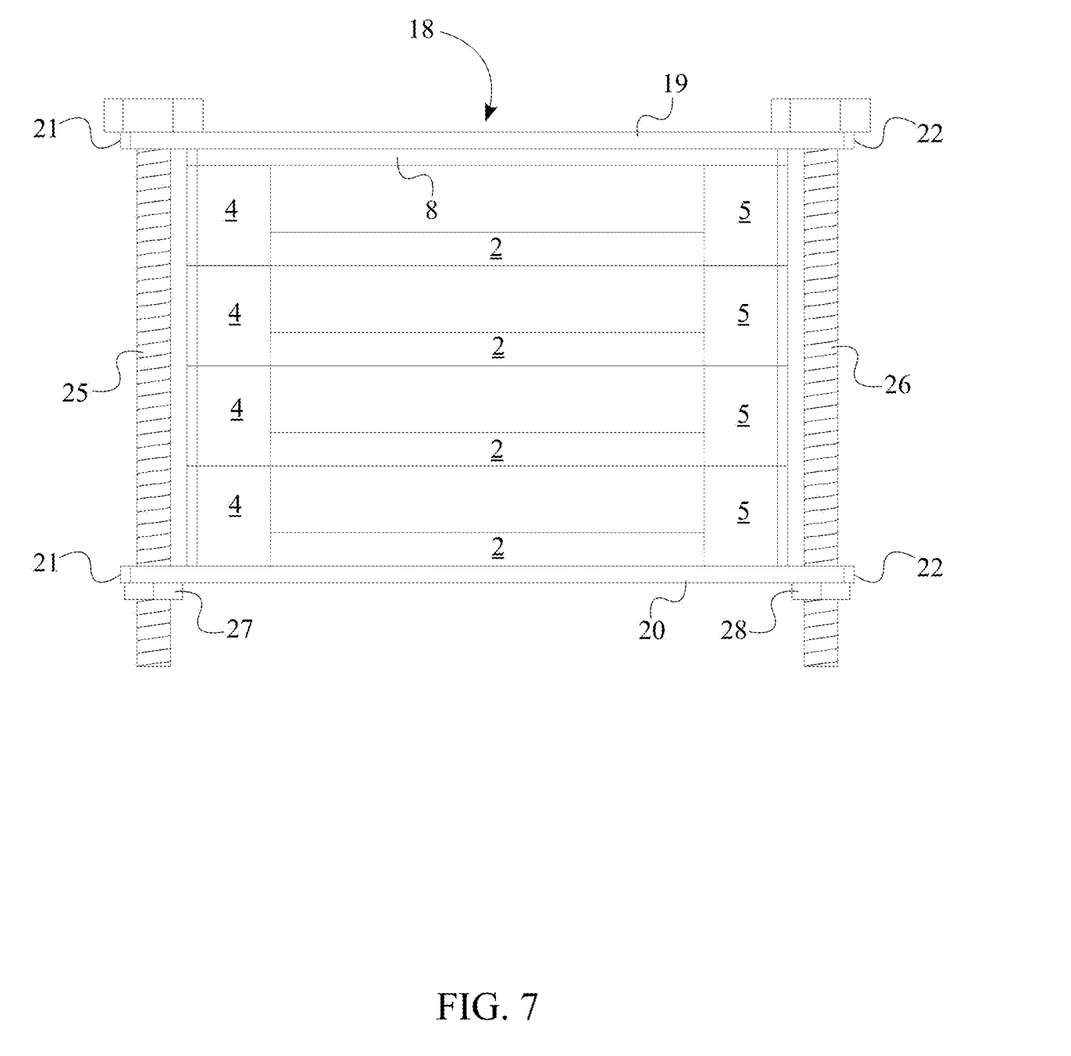
FIG. 7 is a front view of the present invention, wherein the locking clamp is used.
Figure 8:
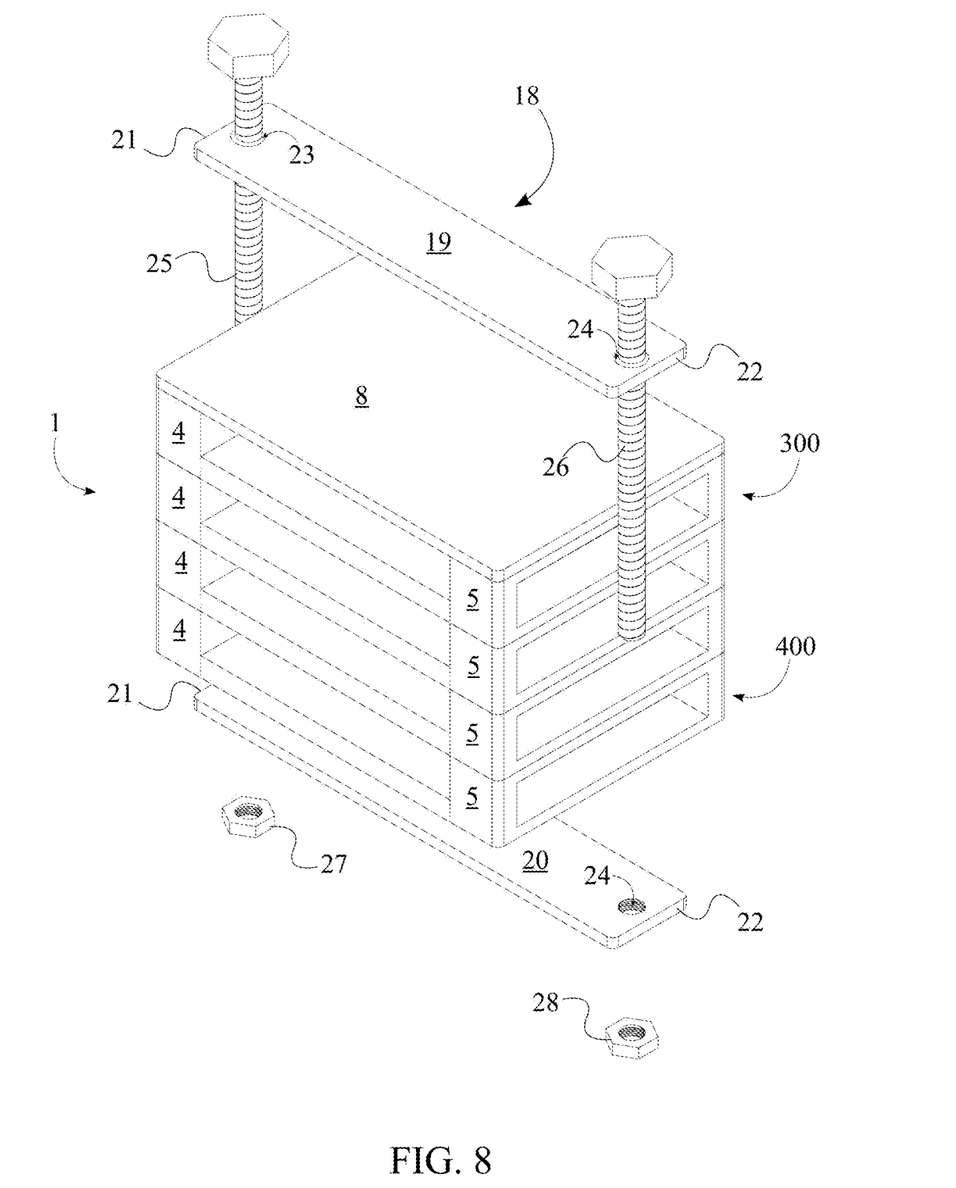
FIG. 8 is an exploded perspective view of the present invention, wherein the locking clamp is used.

As shown in FIGS. 6-8, in another embodiment of the present invention, a locking clamp 18 can be used as the at least one attachment mechanism 11 used for attaching each of the plurality of stackable compartments 1. To do so, the locking clamp 18 comprises a top bracing arm 19, a bottom bracing arm 20, a first threaded rod 25, and a second threaded rod 26 that are used to perimetrically surround the plurality of stackable compartments 1. To do so, the lengths of the top bracing arm 19, the bottom bracing arm 20, the first threaded rod 25, and the second threaded rod 26 are selected according to the dimensions of each of the plurality of stackable compartments 1. To create a perimetrical frame around the plurality of stackable compartments 1, the top bracing arm 19 and the bottom bracing arm 20 each comprise a proximal end 21, a distal end 22, a first rod-receiving hole 23, and a second rod-receiving hole 24. As seen in FIG. 8, the first rod-receiving hole 23 is positioned adjacent the proximal end 21. The second rod-receiving hole 24 is positioned adjacent the distal end 22. The first threaded rod 25 is positioned into the first rod-receiving hole 23 of the top bracing arm 19 and the first rod-receiving hole 23 of the bottom bracing arm 20. The second threaded rod 26 is positioned into the second rod-receiving hole 24 of the top bracing arm 19 and the second rod-receiving hole 24 of the bottom bracing arm 20.

As seen in FIG. 6 and FIG. 7, when the locking clamp is in a clamped configuration, the bottom bracing clamp 20 is positioned adjacent to the bottom surface 3 of the bottommost compartment 400. On the other hand, the top bracing arm 19 is positioned adjacent the top surface 7 of the topmost compartment 300. To secure the top bracing arm 19 and the bottom bracing arm 20 in position, the locking clamp 18 further comprises a first threaded nut 27 and a second threaded nut 28. Preferably, the first threaded nut 27 and the second threaded nut 28 will be wing nuts, so that the first threaded nut 27 and the second threaded nut 28 can be engaged or disengaged without the use of a tool. The first threaded nut 27 is engaged to the first threaded rod 25. In doing so, the first threaded nut 27 is positioned against the bottom bracing arm 20 opposite the bottommost compartment 400. On the other hand, the second threaded nut 28 is engaged to the second threaded rod 26. In doing so, the second threaded nut 28 is also positioned against the bottom bracing arm 20 and opposite the bottommost compartment 400. When the plurality of stackable compartments 1 need to be disassembled, the first threaded nut 27 and the second threaded nut 28 are disengaged from the first threaded rod 25 and the second threaded rod 26 respectively. If the cover plate 8 is being used, the cover plate 8 is positioned adjacent the top bracing arm 19.

As discussed, when the present invention is used for freezing food items, the present invention undergoes significant temperature changes. To withstand the varying temperatures, the plurality of stackable compartments 1 and the cover plate 8 are made of temperature resistant materials. In different embodiments of the present invention, the plurality of stackable compartments 1 and the cover plate 8 can be manufactured from a material selected from a group consisting of wood, plastic, metal, Bisphenol A (BPA)-free polycarbonate, and Pyrex. However, other comparable materials can also be used as long as the functionality of the present invention remains unchanged.

The overall size and shape of the plurality of stackable compartments 1 can vary in different embodiments of the present invention. The volume of food that can be stored depends on the volume provided by each of the plurality of stackable compartments 1. In the preferred embodiment, each of the plurality of stackable compartments 1 has a volume of 1-liter. In another embodiment, each of the plurality of stackable compartments 1 can have a volume of ½-liter. In the preferred embodiment of the present invention, each of the plurality of stackable compartments 1 are identical to each other. However, in another embodiment of the present invention, the volume of each of the plurality of stackable compartments 1 can vary. As an example, the arbitrary compartment 100 can have a volume of ½-liter and the adjacent compartment 200 can have a volume of 1-liter or vice versa.

When the present invention is being used, the following process flow is generally followed. If only a single compartment from the plurality of stackable compartments 1 is used, the cover plate 8 is attached to the top surface 7 through the secondary attachment mechanism 110. Next, the assembly of the single compartment and cover plate 8 are tilted so that the assembly rests on the intermediate lateral wall 6 of the single compartment. Next, a shape-adjustable packaging, such as a resealable bag, is positioned through the opening created by the first lateral wall 4, the second lateral wall 5, the cover plate 8, and the base plate 2. Next, the food item that needs to be frozen is placed in the shape-adjustable packaging so that the shape-adjustable packaging adjusts according to the volume within the single compartment. If a second compartment of the plurality of stackable compartments 1 is to be used, the top surface 7 of the second compartment is pressed against the bottom surface 3 of the single compartment used before. More specifically, the second compartment is removably attached to the first compartment through the at least one attachment mechanism 11. Next, the process of placing the food item is repeated with the second compartment. When the food items within the plurality of stackable compartments 1 are frozen, the frozen food items are removed or not removed according to user preference. If the compartment lid 15 is to be used with the plurality of stackable compartments 1, the lid attachment mechanism 120 is used to attach the compartment lid 15 to each of the plurality of stackable compartments 1.

Although the invention has been explained in relation to its preferred embodiment, it is to be understood that many other possible modifications and variations can be made without departing from the spirit and scope of the invention as hereinafter claimed.

What is claimed is:
1. A stackable food storage unit comprising:
a plurality of stackable compartments;
a cover plate;
a toggle mechanism;
each of the plurality of stackable compartments comprising a top surface and a bottom surface;
each of the plurality of stackable compartments being removably attached to each other via the toggle mechanism;
the top surface of an arbitrary compartment among the plurality of stackable compartments being pressed against the bottom surface of an adjacent compartment among the plurality of stackable compartments;
the cover plate being removably attached to the top surface of a topmost compartment among the plurality of stackable compartments via the toggle mechanism;
each of the plurality of stackable compartments comprising a base plate, a first lateral wall, a second lateral wall and an intermediate lateral wall, the first lateral wall being laterally and perpendicularly connected to the base plate, the second lateral wall being laterally and perpendicularly connected to the base plate opposite the first lateral wall along the base plate, the second lateral wall being oriented parallel to the first lateral wall, the intermediate lateral wall being laterally and perpendicularly connected to the base plate in between the first lateral wall and the second lateral wall;
the cover plate comprising a first lateral edge and a second lateral edge;
the first lateral edge being aligned with the first lateral wall of each of the plurality of stackable compartments;
the second lateral edge being aligned with the second lateral wall of each of the plurality of stackable compartments;
the toggle mechanism comprising a plurality of first toggle pins and a plurality of first pin-receiving holes, a plurality of second toggle pins and a plurality of second pin-receiving holes;
the plurality of first toggle pins and the plurality of second toggle pins each being a key-shaped pin, the plurality of first pin-receiving holes and the plurality of second pin-receiving holes each being a key-shaped hole, the key-shaped pin and the key-shaped pin fitting with each other;
the plurality of first toggle pins being distributed along the top surface of each of the plurality of stackable compartments;
the plurality of second toggle pins being distributed along the top surface of each of the plurality of stackable compartments;
the plurality of first pin-receiving holes being perimetrically positioned along and traversing through the bottom surface of each of the plurality of stackable compartments and the cover plate;
the plurality of second pin-receiving holes being perimetrically positioned along and traversing through the bottom surface of each of the plurality of stackable compartments and the cover plate;
the plurality of first toggle pins distributed along the arbitrary compartment being removably positioned into the plurality of first pin-receiving holes positioned along the adjacent compartment;
the plurality of second toggle pins distributed along the arbitrary compartment being removably positioned into the plurality of second pin-receiving holes positioned along the adjacent compartment;
the plurality of first toggle pins distributed along the topmost compartment being removably positioned into the plurality of first pin-receiving hole positioned along the cover plate;
the plurality of second toggle pins distributed along the topmost compartment being removably positioned into the plurality of second pin-receiving hole positioned along the cover plate;
the plurality of first toggle pins being removably attached along the top surface of each of the plurality of stackable compartments at the first lateral wall of each of the plurality of stackable compartments;
the plurality of second toggle pins being removably attached along the top surface of each of the plurality of stackable compartments at the second lateral wall of each of the plurality of stackable compartments;
the plurality of first pin-receiving holes being positioned along the bottom surface of each of the plurality of stackable compartments at the first lateral wall of each of the plurality of stackable compartments and along the first lateral edge;
the plurality of second pin-receiving holes being positioned along the bottom surface of each of the plurality of stackable compartments at the second lateral wall of each of the plurality of stackable compartments and along the second lateral edge;
each of the plurality of first toggle pins being selectively rotated to a locking position and an unlocking position;
each of the plurality of second toggle pins being selectively rotated to a locking position and an unlocking position;
a corresponding first toggle pin among the plurality of first toggle pins being prevented from being removed from a corresponding first pin-receiving hole among the plurality of first pin-receiving holes in response to any of the plurality of first toggle pins and/or any of the plurality of second toggle pins being rotated to the locking position;
a corresponding second toggle pin among the plurality of second toggle pins being prevented from being removed from a corresponding second pin-receiving hole among the plurality of second pin-receiving holes in response to any of the plurality of first toggle pins and/or any of the plurality of second toggle pins being rotated to the locking position;

the corresponding first toggle pin being allowed to be removed from the corresponding first pin-receiving hole in response to each of the plurality of first toggle pins and each of the plurality of second toggle pins being rotated to the unlocking position; and the corresponding second toggle pin being allowed to be removed from the corresponding second pin-receiving hole in response to each of the plurality of first toggle pins and each of the plurality of second toggle pins being rotated to the unlocking position.

2. The stackable food storage unit as claimed in claim 1 comprising:

each of the plurality of stackable compartments comprising a first engagement channel and a second engagement channel;

the first engagement channel laterally traversing into the first lateral wall opposite to the base plate;

the second engagement channel laterally traversing into the second lateral wall opposite to the base plate;

the plurality of first toggle pins being distributed along the first engagement channel at the top surface;

the plurality of second toggle pins being distributed along the second engagement channel at the top surface;

the plurality of first pin-receiving holes being distributed along the first engagement channel at the bottom surface; and the plurality of second pin-receiving holes being distributed along the second engagement channel at the bottom surface.

3. The stackable food storage unit as claimed in claim 1 comprising:

a locking clamp.

4. The stackable food storage unit as claimed in claim 3 comprising:

the locking clamp comprising a top bracing arm, a bottom bracing arm, a first threaded rod and a second threaded rod;

the top bracing arm and the bottom bracing arm each comprising a proximal end, a distal end, a first rod-receiving hole and a second rod-receiving hole;

the first rod-receiving hole being positioned adjacent the proximal end;

the second-rod receiving hole being positioned adjacent the distal end;

the first threaded rod being positioned through the first rod-receiving hole of the top bracing arm and the bottom bracing arm; and the second threaded rod being positioned through the second rod-receiving hole of the top bracing arm and the bottom bracing arm.

5. The stackable food storage unit as claimed in claim 4 comprising:

the locking clamp comprising a first threaded nut and a second threaded nut;

the bottom bracing arm being positioned adjacent the bottom surface of the bottommost compartment;

the top bracing arm being positioned adjacent the top surface of the topmost compartment;

the first threaded nut being engaged with the first threaded rod;

the first threaded nut being positioned against the bottom bracing arm opposite the bottommost compartment;

the second threaded nut being engaged with the second threaded rod; and the second threaded nut being positioned against the bottom bracing arm opposite the bottommost compartment.

6. The stackable food storage unit as claimed in claim 1, wherein the plurality of stackable compartments and the cover plate are manufactured from temperature resistant materials.

7. The stackable food storage unit as claimed in claim 1, wherein the plurality of stackable compartments and the cover plate are manufactured from a material selected from a group consisting of wood, Bisphenol A(BPA)-free polycarbonate, and soda-lime glass.

8. The stackable food storage unit as claimed in claim 1, wherein each of the plurality of stackable compartments has a volume of ½-liter.

9. The stackable food storage unit as claimed in claim 1, wherein each of the plurality of stackable compartments has a volume of 1-liter.

* * * * *